United States Patent [19]
Shibata et al.

[11] Patent Number: 5,247,413
[45] Date of Patent: Sep. 21, 1993

[54] MAGNETORESISTANCE EFFECT TYPE THIN FILM MAGNETIC HEAD WITH NOISE REDUCING ELECTRODE

[75] Inventors: Takuji Shibata; Hideo Suyama, both of Miyagi, Japan

[73] Assignee: Sony Corporation, Tokyo, Japan

[21] Appl. No.: 11,124

[22] Filed: Jan. 29, 1993

Related U.S. Application Data

[63] Continuation of Ser. No. 700,761, May 15, 1991, abandoned.

[30] Foreign Application Priority Data

May 16, 1990 [JP] Japan .................. 2-125852

[51] Int. Cl.$^5$ ................................. G11B 5/39
[52] U.S. Cl. ........................................ 360/113
[58] Field of Search .......................... 360/113

[56] References Cited

U.S. PATENT DOCUMENTS 4,783,711 11/1988 Kitada et al. ............... 360/113

FOREIGN PATENT DOCUMENTS 0107982 5/1984 European Pat. Off. .
0221540A3 5/1987 European Pat. Off. .
3604720A1 10/1986 Fed. Rep. of Germany .
60-193102 10/1985 Japan .
2105093A 3/1983 United Kingdom .

Primary Examiner—Robert S. Tupper
Attorney, Agent, or Firm—Hill, Steadman & Simpson

[57] ABSTRACT

A magnetoresistance effect type thin film magnetic head comprising an MR element with electrodes provided at a fore end and a rear end thereof in the direction to confront a magnetic recording medium, wherein the electrode at the fore end of such MR element is electrically connected to a shielding magnetic layer to thereby eliminate any electrical instability at the fore end of the MR element, hence averting the characteristic instability in a playback mode while minimizing the unsteady generation of noise. The thin film magnetic head further comprises a first conductor having a great capacity and disposed in the proximity of the MR element, and a second conductor having a capacity smaller than that of the first conductor and connected to the fore-end electrode of the MR element. Such first and second conductors are connected to respective ground potentials independently of each other, thereby averting breakdown of the magnetic head that may otherwise be caused by the static charge generated due to the rotation of the magnetic recording medium during the operation.

4 Claims, 8 Drawing Sheets

MAGNETORESISTANCE EFFECT TYPE THIN FILM MAGNETIC HEAD WITH NOISE REDUCING ELECTRODE

This is a continuation of application Ser. No. 700,761, filed May 15, 1991 now abandoned.

BACKGROUND OF THE INVENTION

1. Field of the Invention

The present invention relates to a magnetoresistance effect type thin film magnetic head adapted for averting the characteristic instability in a playback mode while minimizing unsteady generation of noise.

2. Description of the Prior Art

In a conventional magnetoresistance effect type thin film magnetic head having a shielding structure, a magnetoresistance effect element (MR element) 2 is so disposed on a substrate 1 that, as illustrated in FIG. 5, its longitudinal direction becomes parallel with a head contact surface a (vertical to the drawing paper face), and electrodes (not shown) are led out from both ends of the MR element 2, while shielding magnetic layers 4 and 5 are disposed above and below the MR element 2 through an insulator layer 3. In such MR element 2, a sense current supplied thereto flows orthogonally to a signal magnetic field generated from a magnetic recording medium, and the two electrodes are exposed on the magnetic head surface a. Therefore, in such conventional thin film magnetic head 6, the electrodes at both ends thereof are brought simultaneously into contact with the main surface of a conductive magnetic recording medium formed by sputtering or the like on a disk particularly in a hard disk device. Upon contact of the two electrodes with the disk surface, an electrical resistance change occurs between the electrodes in addition to the electric resistance change in the MR element 2 and then causes generation of great noise.

For the purpose of solving the problems mentioned, there is proposed an improved thin film magnetic head 8 wherein, as illustrated in FIG. 6, an MR element 12 is disposed vertically to a head surface a, and two electrodes 7A and 7B are led out from both ends of the MR element 12. One electrode 7A at the fore end is exposed on the magnetic head surface a while the other electrode 7B at the rear end is positioned inside the magnetic head without being exposed on the magnetic head surface a, and a sense current i supplied to the MR element 12 is caused to flow in the same direction as a signal magnetic field generated from a magnetic recording medium.

In such thin film magnetic head 8, a bias conductor 9 is formed for applying a bias magnetic field to the MR element 12, and shielding magnetic layers 4 and 5 are disposed through an insulator layer 3 above and below the MR element 12 inclusive of the bias conductor 9. In this structure, the electrodes 7A and 7B are formed to be thicker than the MR element 12 and are composed of a high-conductivity metallic material, so that the electric resistance change caused between the electrodes 7A and 7B is so small as to be negligible despite contact of the fore end electrode 7A with the disk surface, thereby inducing no great noise. Further in the above proposal where the MR element 12 is composed of two magnetic layers 12b and 12c via a nonmagnetic intermediate layer 12a, it is possible to certainly avert generation of Barkhausen noise that may otherwise be derived from movement of a magnetic wall.

There are generally known two types relative to the thin film magnetic head having the MR element 12 where a sense current is caused to flow in the same direction as a signal magnetic field. One type is such as shown in FIG. 6 where the MR element 12 and one electrode 7A are exposed on the magnetic head surface a; and the other type (not shown) is such that the MR element 12 is positioned inside, and a signal magnetic field is led to the MR element 12 by way of a magnetic member termed a yoke. The former thin film magnetic head is considered to be superior with respect to the sensitivity.

The upper and lower shielding magnetic layers 4 and 5 provided for enhancing the reproducing resolution are usually composed of a metal such as permalloy. And the electrodes 7A and 7B for the MR element 12 are generally thicker than the MR element and are composed of a material having a low resistivity. Therefore, if the fore-end electrode 7A of the MR element 12 in the thin film magnetic head 8 of FIG. 6 happens to be short-circuited electrically to the shielding metallic magnetic layer 4 in the manufacturing process or during the operation of the magnetic head, such a fault induces disorder of the reproducing characteristics and generation of noise.

Since the reproducing gap 1 defined between the shielding magnetic layer 4 and the MR element 12 is practically as small as several thousand angstroms (0.6 to 0.3 microns), it has been unavoidable that entrance of any extremely small conductive dirt during the magnetic head operation or any incomplete insulation in the manufacturing process renders the reproducing characteristics unstable.

Meanwhile in the thin film magnetic head of FIG. 6 where the fore end of the MR element is exposed on the magnetic head surface a, there exist some problems including abrasion and erosion, but such problems have already been mostly solved. However, an undesired phenomenon may occur in that the MR element can be suddenly broken during the operation of the magnetic head or at the rise and halt thereof, to consequently fail.

As a result of studying the above mechanism, the following has been found as illustrated in FIG. 8 where a magnetic disk 14 serving as a recording medium is disposed rotatably on a spindle 15 in a hard disk device. Denoted by 8 is an MR thin film magnetic head.

When a stationary state illustrated in FIG. 8A is changed to an operating state of FIG. 8B, the surface potential of the magnetic disk 14 is increased due to the rotation of the magnetic disk 14 (see FIG. 9). The potential difference $V_1 - V_0$ may reach 20 volts or so and, if the thin film magnetic head 8 is brought into contact with the magnetic disk 14 under such condition (as in a stopping state of FIG. 8C), the static charge on the surface of the magnetic disk 14 is released therefrom to the MR element to consequently damage the same. Meanwhile, when the thin film magnetic head 8 is in contact with the magnetic disk 14 in a stationary state, the above damage can be prevented by opening the circuit of the MR element. However, during the magnetic head operation (in a flying state), the distance d between the magnetic disk 14 and the thin film magnetic head 8 is as small as 0.1 to 0.3 micron, so they may be brought into mutual contact by some dirt or vibration, and no adequate countermeasures for such a trouble have been contrived heretofore.

OBJECTS AND SUMMARY OF THE INVENTION

It is a primary object of the present invention to provide an improved magnetoresistance effect type thin film magnetic head which is capable of eliminating electrical instability at the fore end of its MR element.

And another object of the present invention resides in providing an improved magnetoresistance effect type thin film magnetic head which averts breakdown of its MR element that may otherwise be derived from static charge on the surface of a magnetic recording medium.

For the purpose of achieving the primary object mentioned, the present invention comprises an MR element with electrodes provided at a fore end and a rear end thereof in the direction to confront a magnetic recording medium, wherein the electrode at the fore end of such MR element is electrically connected to a shielding magnetic layer to thereby eliminate any electrical instability at the fore end of the MR element, hence averting the characteristic instability in a playback mode while minimizing the unsteady generation of noise.

For the purpose of achieving another object mentioned, the present invention comprises an MR element with electrodes provided at a fore end and a rear end thereof in the direction to confront a magnetic recording medium, a first conductor having a great capacity and disposed in the proximity of the MR element, and a second conductor having a capacity smaller than that of the first conductor and connected to the fore-end electrode of the MR element. Such first and second conductors are connected to respective ground potentials independently of each other, thereby averting breakdown of the magnetic head that may otherwise be caused by the static charge generated due to the rotation of the magnetic recording medium during the operation.

The above and other features and advantages of the present invention will become apparent from the following description which will be given with reference to the illustrative accompanying drawings.

DESCRIPTION OF THE PREFERRED EMBODIMENTS

Hereinafter preferred embodiments of the present invention will be described with reference to the accompanying drawings.

Figure 1:
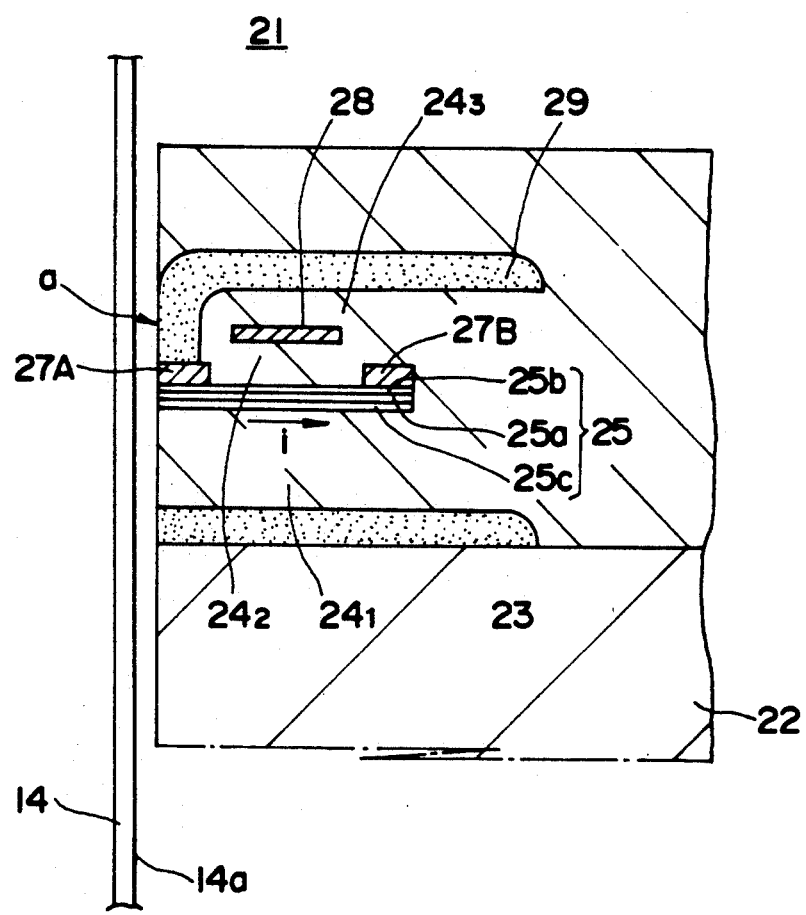
FIG. 1 is a sectional view of an exemplary magnetoresistance effect type thin film magnetic head embodying the present invention.

FIG. 1 is a sectional view of a magnetoresistance effect type thin film magnetic head 21 according to a first embodiment. In this thin film magnetic head 21, as illustrated, a lower shielding magnetic layer 23 of a soft magnetic metal such as permalloy and an insulator layer $24_1$ are formed on a support substrate 22 by the thin film forming technique, and an MR element 25 is formed on the insulator layer $24_1$ in the direction to confront a magnetic recording medium such as a magnetic disk 14, i.e., vertically to a head surface a. Electrodes 27A and 27B are formed at a fore end and a rear end of the MR element 25 respectively, and then an insulator layer $24_2$, a bias conductor 28 and an insulator layer $24_3$ are formed sequentially on the MR element 25. Further an upper shielding magnetic layer 29 of a soft magnetic metal such as permalloy is formed thereon in such a manner that a portion of the layer 29 is electrically connected to the fore-end electrode 27A of the MR element 25.

In this case, the fore end region of the MR element 25 and the fore-end electrode 27A are exposed on the magnetic head surface a while the rear-end electrode 27B is positioned inside the magnetic head, and a sense current supplied to the MR element 25 is caused to flow in the same direction as a signal magnetic field generated from the magnetic disk 14. The fore-end electrode 27A is electrically connected to the upper shielding magnetic layer 29, while the MR element 25 is magnetically isolated from the upper shielding magnetic layer 29. Therefore the connection of the fore-end electrode 27A to the upper shielding magnetic layer 29 is effected either through a nonmagnetic metal layer or by means of the nonmagnetic electrode 27A. The MR element 25 in this embodiment is composed of two magnetic layers $25b$ and $25c$ with a nonmagnetic intermediate layer $25a$ as illustrated, thereby achieving certain prevention of Barkhausen noise based on the movement of a magnetic wall.

In the thin film magnetic head 21 of such a constitution where the fore-end electrode 27A of the MR element 25 is electrically connected to the upper shielding magnetic layer 29, the fore-end electrode 27A and the upper shielding magnetic layer 29 become one electrode region as viewed from the MR element 25. Therefore, in case the electrode of the MR element 25 is led out from the metallic layer of the fore-end electrode 27A or from the upper shielding magnetic layer 29, the respective potentials of the upper shielding magnetic layer 29 and the fore-end electrode 27A are maintained to be substantially equal to each other (since the upper shielding layer 29 usually has a sufficient thickness of several microns), so that the fore end region of the MR element 25 is rendered electrically stable.

Consequently it becomes possible to eliminate the electrical instability prone to occur in the conventional head at the fore end of the MR element due to the small thickness of the insulator layer $24_3$ which is interposed between the fore-end electrode 27A of the MR element 25 and the shielding magnetic layer 29. And thus the fore end region of the MR element can be electrically stabilized regardless of the presence or absence of any dirt in the manufacturing process or during the magnetic head operation, hence ensuring stable characteristics in a playback mode while preventing generation of unsteady noise.

It is a matter of course that, for attaining further complete stability, the upper shielding magnetic layer 29 and the lower shielding magnetic layer 23 may be partially connected to each other.

Figure 2:
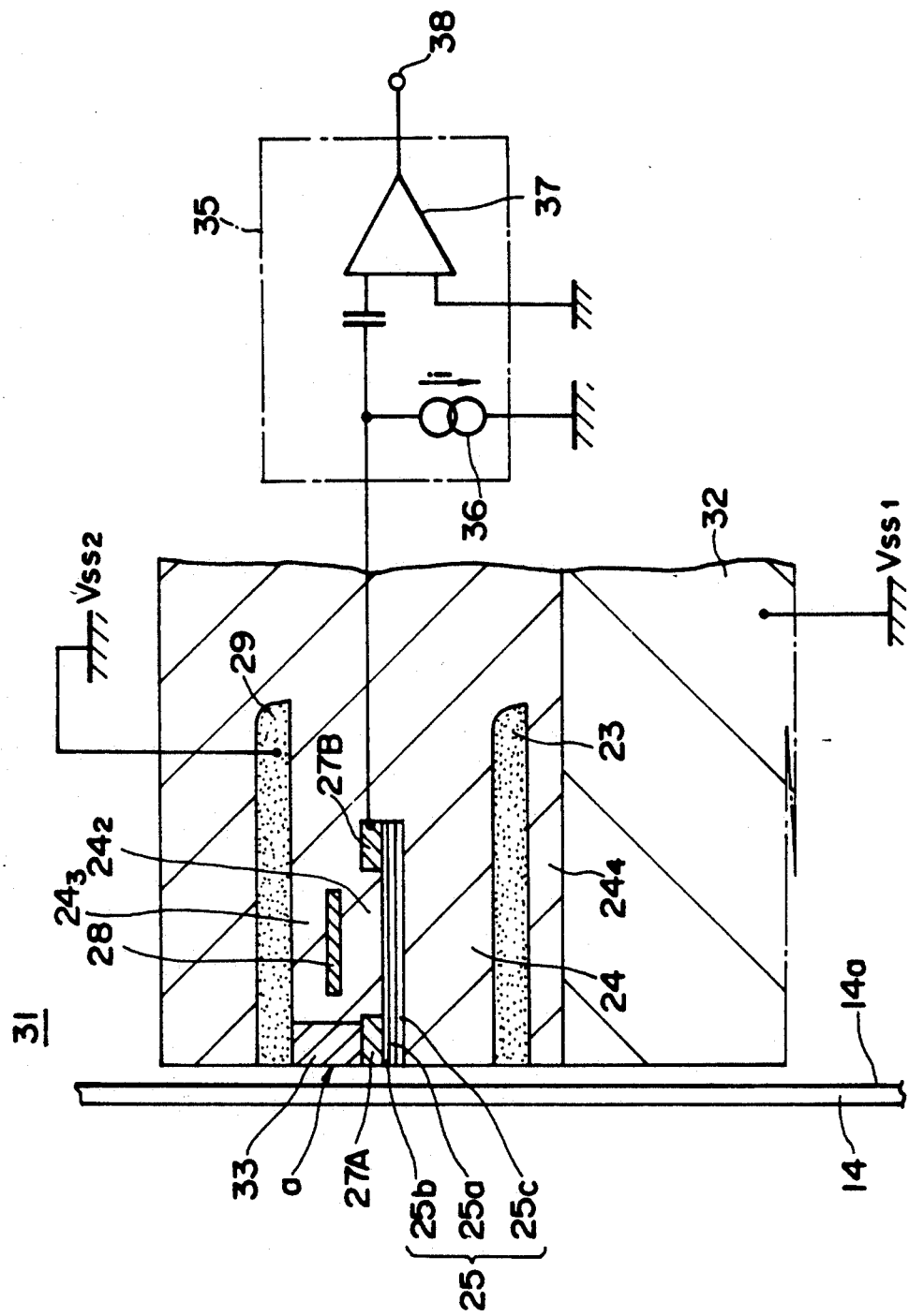
FIG. 2 is a sectional view of another embodiment of the present invention.

FIG. 2 is a sectional view of another magnetoresistance effect type thin film magnetic head 31 according to a second embodiment. In this thin film magnetic head 31, there are sequentially formed an insulator layer $24_4$, a lower shielding magnetic layer 23 of a soft magnetic metal such as permalloy and an insulator layer $24_1$ by the thin film forming technique on a support substrate 32 (corresponding to a first conductor) composed of a nonmagnetic conductive material such as $Al_2O_3$-Tic. Subsequently an MR element 25 of the aforementioned dual-layer structure is provided on the insulator layer $24_1$ in a posture perpendicular to a head surface a which confronts the surface 14a of a magnetic disk 14. Then electrodes 27A and 27B are formed respectively at a fore end and a rear end of the MR element 25, and thereafter an insulator layer $24_2$, a bias conductor 28 and an upper shielding magnetic layer 29 (corresponding to a second conductor) of a soft magnetic metal such as permalloy are sequentially formed on the MR element 25. The upper shielding layer 29 is electrically connected to the fore-end electrode 27A of the MR element 25 through a nonmagnetic connecting conductor 33, and further the support substrate 32 and the upper shielding magnetic layer 29 are connected to respective ground potentials $V_{SS1}$ and $V_{SS2}$ independently of each other. And a predetermined sense current i is supplied from a constant current source 36 in an amplifier unit 35 to flow in the MR element 25, whereby any electric resistance change caused in the MR element 25 in accordance with the state of magnetization of the disk surface is converted into a voltage change between the electrodes 27A and 27B. Then such voltage change is processed through an amplifier 37 in the amplifier unit 35 and is thereby obtained as an output signal of the thin film magnetic head 31 from an output terminal 38. The support substrate 32 is so formed as to have a great area and a great capacity.

In this case also, the fore end region of the MR element 25 and its fore-end electrode 27A are exposed on the magnetic head surface a while the rear-end electrode 27B is positioned inside the magnetic head similarly to the foregoing embodiment, and a sense current i supplied to the MR element 25 is caused to flow therein in the same direction as a signal magnetic field. In a modification, the fore-end electrode 27A may be composed of a nonmagnetic conductive material and connected directly to the upper shielding magnetic layer 29.

In the thin film magnetic head 31 of such a constitution, if the thin film magnetic head 25 is brought into contact with the charged disk surface 14a during its operation or at the rise and halt thereof, the static charge is mostly released to the ground potential $V_{SS1}$ via the great-capacity support substrate 32 having a large area. And since the ground potential $V_{SS1}$ is independent of the MR element, there never occurs an undesired phenomenon in which the static charge flows into the circuit of the MR element and damages the same or generates noise. Even if some charge slightly flows into the MR element 25 due to contact therewith, the charge is promptly released to the ground potential $V_{SS2}$ via the connecting conductor 33 and the upper shielding magnetic layer 29 to thereby avert harmful influence on the circuit of the MR element.

In this thin film magnetic head 31 where the fore-end electrode 27A of the MR element 25 is electrically connected to the upper shielding magnetic layer 29, it is a matter of course that the functional effect of electrically stabilizing the fore end region of the MR element is similarly achievable as described before with reference to FIG. 1.

Figure 3:
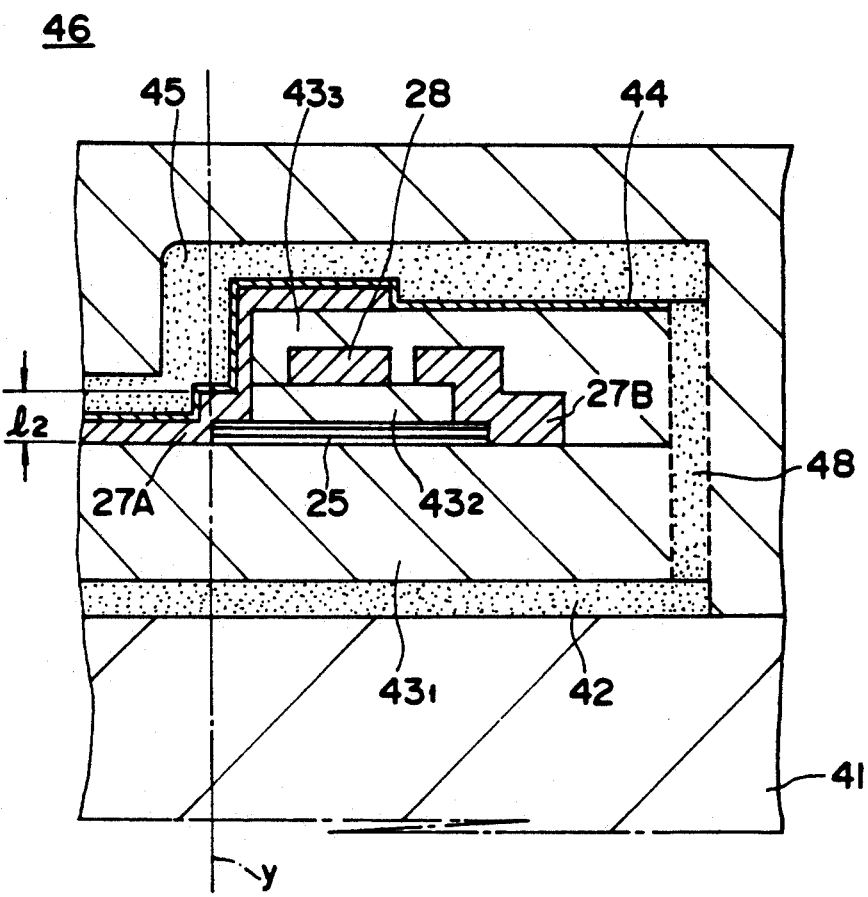
FIGS. 3 and 4 are sectional views of further embodiments of the present invention.
Figure 4:
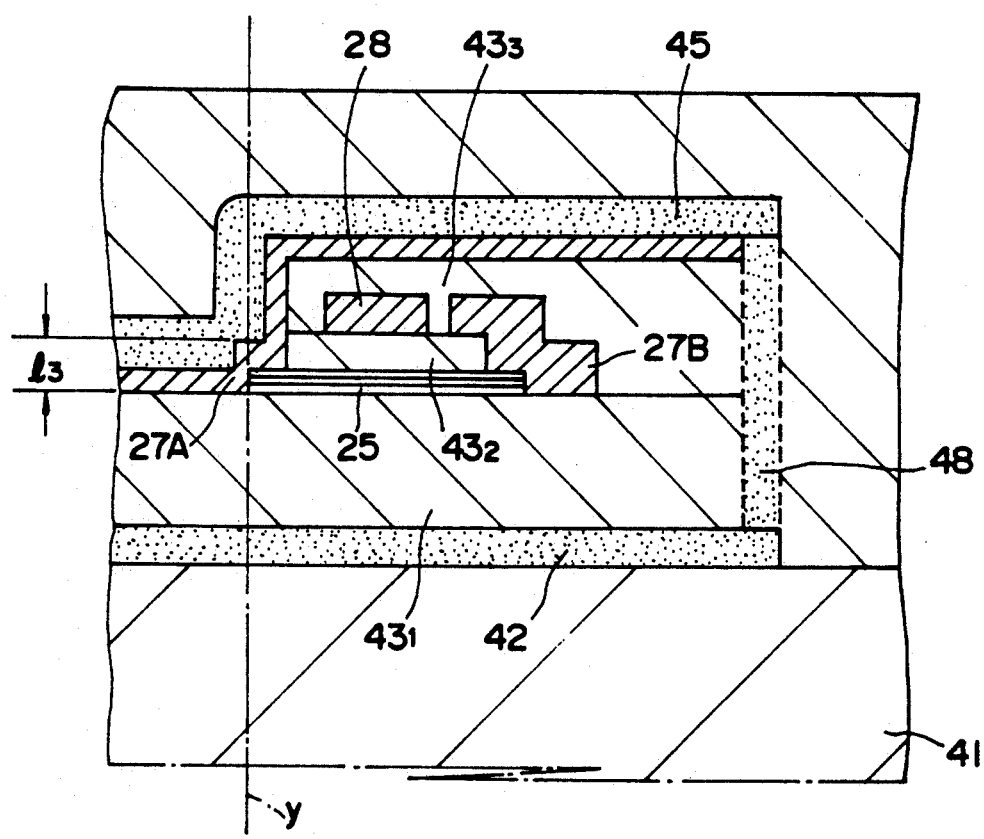
Figure 5:
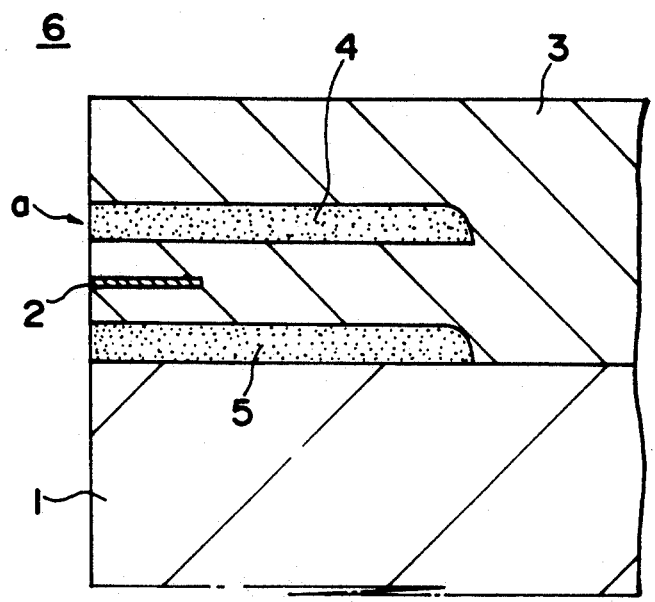
FIGS. 5 and 6 are sectional views of conventional magnetoresistance effect type thin film magnetic heads.
Figure 6:
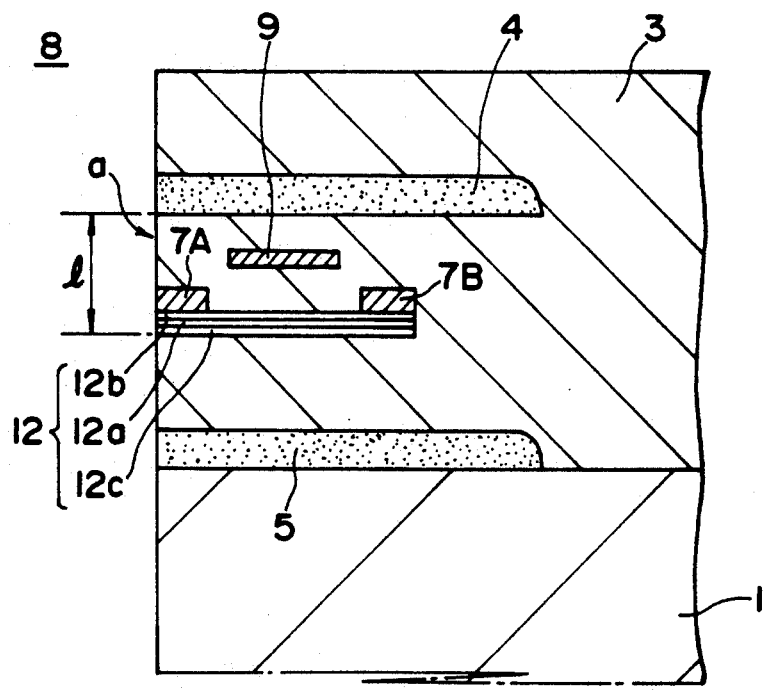
Figure 7A:
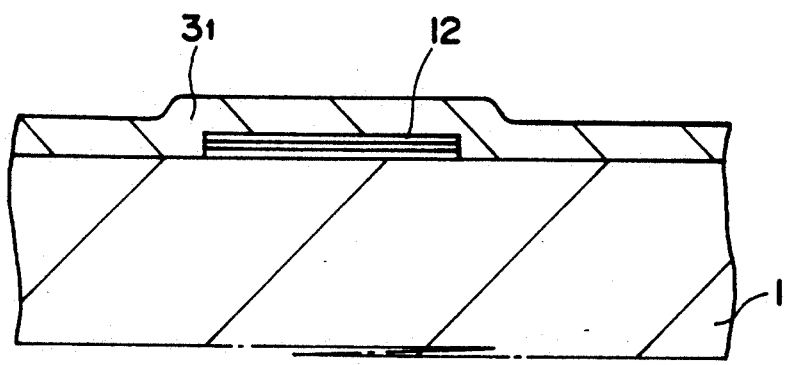
FIGS. 7A, 7B, 7C and 7D show sequential steps in a conventional manufacturing process.
Figure 7B:
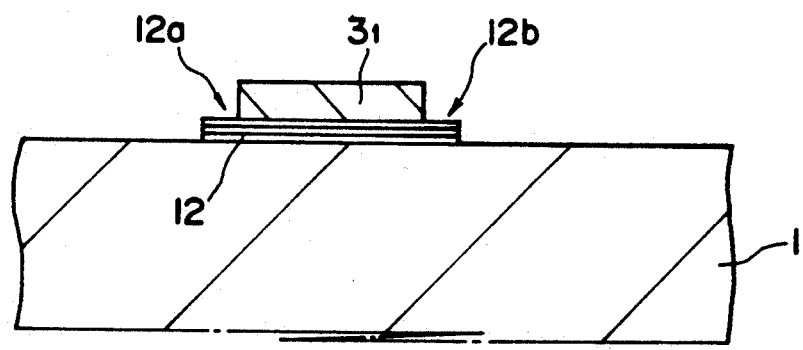
Figure 7C:
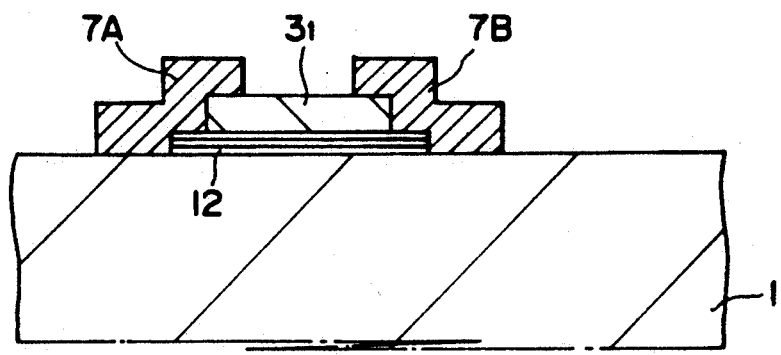
Figure 7D:
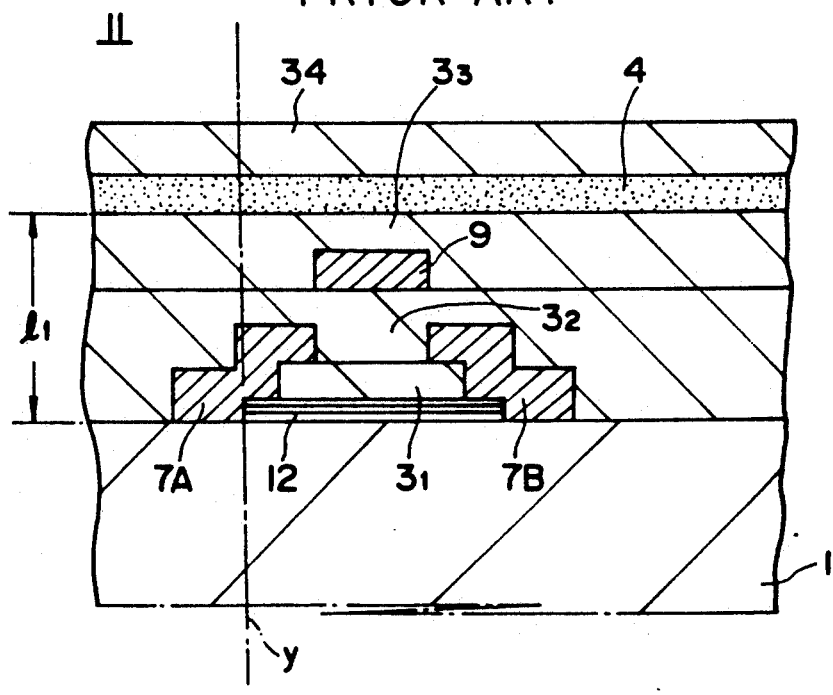
Figure 8A:
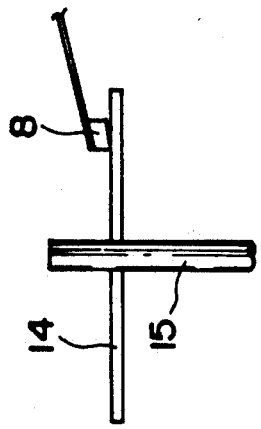
FIGS. 8A, 8B, 8C and 9 are schematic diagrams for explaining the present invention.
Figure 8B:
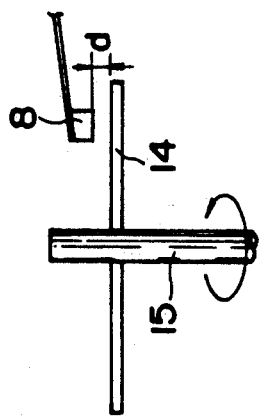
Figure 8C:
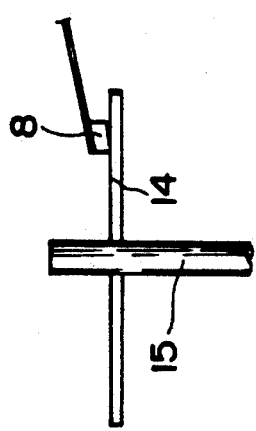
Figure 9:
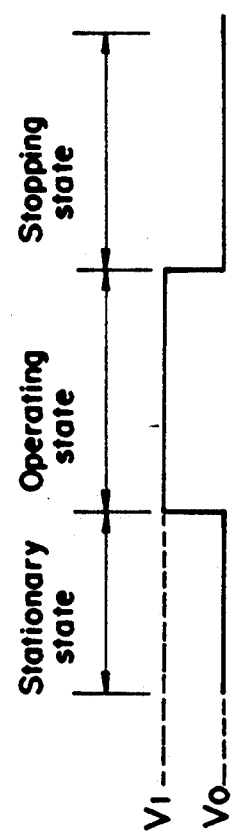

Meanwhile it is requisite to realize a narrow-gap structure for further increasing the linear recording density in the magnetoresistance effect type thin film magnetic head. FIG. 7 illustrates an exemplary conventional thin film magnetic head of such type manufactured by the known method. First an MR element 12 and an insulator layer 31 are formed on a support substrate 1 as shown in FIG. 7A, and then the insulator layer $3_1$ is patterned to expose both a fore end 12a and a rear end 12b of the MR element 12 as shown in FIG. 7B. Thereafter a fore-end electrode 7A and a rear-end electrode 7B are formed to be connected respectively to the fore end and the rear end of the MR element 12, as shown in FIG. 7C. Subsequently an insulator layer $3_2$, a bias conductor 9, an insulator layer $3_3$, an upper shielding magnetic layer 4 and an insulator layer $3_4$ are formed sequentially as shown in FIG. 7D, and then the above structure is polished up to a chained-line position y to thereby produce a thin film magnetic head 11. A gap 11 to be finally obtained in the thin film magnetic head 11 is determined by the dimensional sum of the fore-end electrode 7A and the insulator layers $3_2$, $3_3$. Therefore, in the thin film magnetic head having a dual-layer MR element with a bias conductor in particular, a limit exists in the gap 11 with the reliability taken into consideration, and consequently it is difficult to attain a further narrower gap. FIGS. 3 and 4 show other embodiments each contrived to solve the above problem for realizing a narrow-gap structure. In the example of FIG. 3, a lower shielding magnetic layer 42, an insulator layer $43_1$, an MR element 25 and an insulator layer $43_2$ are formed sequentially on a support substrate 41. After the insulator layer $43_2$ is patterned, a bias conductor 28 on the insulator layer $43_2$ and a rear-end electrode 27B to be connected to the rear end of the MR element 25 are formed of a conductive material simultaneously with each other. The bias conductor 28 and the rear-end electrode 27B may be composed of a high-conductivity material such as Au or Cu, or of the same metallic material as that of an undermentioned fore-end electrode. Subsequently the bias conductor 28 and the rear-end electrode 27B are covered with an insulator layer $43_3$, and patterning is so executed as to simultaneously remove the portions of the insulator layers $43_3$, $43_2$ corresponding to a fore-end gap, thereby forming a fore-end electride 27A to be connected to the fore end of the MR element 25.

The fore-end electrode 27A is composed of a nonmagnetic moisture-resistant conductor such as Ti, Cr, Mo, W, C or SuS and is connected to an external electrode in an unshown vicinity. And an upper shielding magnetic layer 45 is formed to be electrically connected to the fore-end electrode 27A via a bonding layer 44 composed of a nonmagnetic metal such as Cr. Thereafter the above structure is polished up to a chained-line position y to thereby produce a thin film magnetic head 46.

In another example of FIG. 4, a lower shielding magnetic layer 42, an insulator layer $43_1$, an MR element 25 and an insulator layer $43_2$ are formed sequentially on a support substrate 41 in a procedure similar to the preceding embodiment, and after the insulator layer $43_2$ is patterned, a bias conductor 28 on the insulator layer $43_2$ and a rear-end electrode 27B to be connected to the rear end of the MR element 25 are composed of the same conductive material simultaneously with each other. Subsequently the bias conductor 28 and the rear-end electrode 27B are covered with an insulator layer $43_3$, and then patterning is so executed as to remove the portions of the insulator layers $43_2$, $43_3$ corresponding to a fore-end gap, thereby forming a fore-end electrode 27A to be connected to the fore end of the MR element 25. In this case, the fore-end electrode 27A is composed of a nonmagnetic metal to serve also as an undercoat bonding layer for an upper shielding magnetic layer 45. This magnetic layer 45 is formed to be electrically connected to the fore-end electrode 27A, and thereafter the above structure is polished up to a chained-line position y to thereby produce a thin film magnetic head 47.

In both FIGS. 3 and 4, the upper and lower shielding magnetic layers 45, 42 may be connected to each other as represented by a broken line 48. The support substrate 41 may be an insulator substrate or one having an insulator layer on a conductive support member of a suitable material such as $Al_2O_3$-Tic shown in FIGS. 2. Therefore the thin film magnetic heads 46 and 47 of FIGS. 3 and 4 may be so constituted as the aforementioned example of FIG. 1 or FIG. 2.

According to the constitutions of FIGS. 3 and 4, the gaps 12 and 13 are dimensionally reduced by a length corresponding to the conventional insulator layers $3_2$ and $3_3$ (see FIG. 7D), hence realizing a narrower-gap structure. Since the gap region is formed after completion of the rear-end electrode 27B according to this manufacturing method, the thickness of the rear-end electrode 27B can be rendered sufficiently great to consequently diminish the resistance of the rear-end electrode 27B to a small value, thereby minimizing generation of noise based on the heat from the electrode and hence enhancing the signal-to-noise ratio.

Furthermore, no positional deviation occurs between the depth of the MR element and the narrow gap portion, since the insulator layers $43_2$ and $43_3$ are patterned in the same step and the connecting portion of the fore-end electrode of the MR element is formed simultaneously with removal of the insulator layer for achieving a narrow-gap structure. Consequently, there exists no possibility that the gap becomes wide while the depth of the MR element remains, and short-circuiting trouble is never induced between the bias conductor 28 and the upper shielding magnetic layer 45, hence attaining the advantage of high controllability in the manufacturing process to produce a satisfactory MR type thin film magnetic head with a narrow gap and a small depth.

In addition, the problem of interlayer short-circuiting can be solved as the bias conductor 28 is formed simultaneously with the rear-end electrode 27B. In the fore-end electrode 27A where the gap portion is narrow, the resistance value of the electrode material corresponding to such portion is rendered sufficiently small to raise no problem at all.

Although a dual-layer MR element is employed in each of the embodiments mentioned, it is possible to use a single-layer MR element as well.

As described hereinabove, according to the magnetoresistance effect type thin film magnetic head of the present invention, the fore-end electrode of the MR element is electrically connected to the shielding magnetic layer, so that the fore end region of the MR element can be electrically stabilized to attain high stability of the characteristics in a playback mode while preventing generation of unsteady noise.

Furthermore, the first conductor of a great capacity, disposed in the proximity of the MR element, and the second conductor of a small capacity, connected to the fore-end electrode of the MR element, are connected to respective ground potentials independently of each other, thereby averting breakdown of the operating thin film magnetic head that may otherwise be caused by the static charge on the surface of a magnetic recording medium.

What is claimed is:

1. A magnetoresistance effect type thin film magnetic head comprising:

first and second spaced shielding magnetic layers, the front ends of said first and second shielding magnetic layers forming a magnetic gap therebetween, said magnetic gap facing the opposing surface of a magnetic recording medium;

a magnetoresistance effect element being held between said first and second shielding magnetic layers, insulator layers being interposed between said magnetoresistance effect element and said shielding magnetic layers; and a first electrode and a second electrode being formed at a fore end and a rear end of said magnetoresistance effect element respectively, said first electrode being electrically in contact with said first shielding magnetic layer.

2. A magnetoresistance effect type thin film magnetic head comprising:

a substrate which is nonmagnetic and electrically conductive;

first and second spaced shielding magnetic layers being formed above said substrate, the front ends of said first and second shielding magnetic layers forming a magnetic gap therebetween, said magnetic gap facing the opposing surface of a magnetic recording medium;

a magnetoresistance effect element being held between said first and second shielding magnetic layers, insulator layers being interposed between said magnetoresistance effect element and said shielding magnetic layers;

a first electrode and a second electrode being formed at a fore end and a rear end of said magnetoresistance effect element respectively, said first electrode being electrically in contact with said first shielding magnetic layer; and said substrate and said first shielding magnetic layer being connected to respective ground potentials independently of each other.

3. A thin film magnetic head according to claim 1 or claim 2, said first electrode facing the opposing surface of a magnetic recording medium.

4. A thin film magnetic head according to claim 1 or claim 2, said first electrode being nonmagnetic.

* * * * *